(12) United States Patent
Auer et al.

(10) Patent No.: US 8,663,043 B2
(45) Date of Patent: Mar. 4, 2014

(54) CABLE CONTROL ACTUATING DEVICE FOR A BICYCLE DERAILLEUR

(75) Inventors: Marcus Auer, Schwebheim (DE); Thorsten Hamisch, Wurzburg (DE)

(73) Assignee: SRAM Deutschland GmbH (DE)

( * ) Notice: Subject to any disclaimer, the term of this patent is extended or adjusted under 35 U.S.C. 154(b) by 318 days.

(21) Appl. No.: 13/047,711

(22) Filed: Mar. 14, 2011

(65) Prior Publication Data

US 2011/0224037 A1 Sep. 15, 2011

(30) Foreign Application Priority Data

Mar. 12, 2010 (DE) .......... 10 2010 011 391

(51) Int. Cl.
  *F16H 63/02* (2006.01)
(52) U.S. Cl.
  USPC .......................................... 474/82
(58) Field of Classification Search
  USPC .................................... 474/80, 82
  See application file for complete search history.

(56) References Cited

U.S. PATENT DOCUMENTS

| | | | | |
|---|---|---|---|---|
| 6,234,927 B1 * | 5/2001 | Peng | | 474/82 |
| 6,341,538 B1 * | 1/2002 | Takachi | | 74/502.6 |
| 6,482,115 B2 * | 11/2002 | Takachi | | 474/80 |
| 6,695,729 B2 * | 2/2004 | Ozaki | | 474/80 |
| 6,923,740 B2 * | 8/2005 | Nanko | | 474/82 |
| 7,081,058 B2 * | 7/2006 | Nankou | | 474/80 |
| 7,189,173 B2 * | 3/2007 | Tsai et al. | | 474/82 |
| 7,438,657 B2 * | 10/2008 | Nakai et al. | | 474/80 |
| 7,722,486 B2 * | 5/2010 | Nanko | | 474/80 |
| 8,337,343 B2 * | 12/2012 | Lin | | 474/82 |
| 2002/0165054 A1 * | 11/2002 | Chen | | 474/82 |
| 2003/0100393 A1 * | 5/2003 | Nanko | | 474/80 |

FOREIGN PATENT DOCUMENTS

| | | |
|---|---|---|
| DE | 20023891 U1 | 5/2007 |
| EP | 1 031 504 | 8/2000 |
| EP | 1 040 992 | 10/2000 |
| EP | 1314636 | 4/2007 |
| EP | 0 653 347 | 5/2007 |

* cited by examiner

*Primary Examiner* — William E Dondero
*Assistant Examiner* — Mark K Buse
(74) *Attorney, Agent, or Firm* — Milan Milosevic; Lisa Serdynski; Steven Courtright

(57) ABSTRACT

A device for guiding and supporting the cable for actuating a front derailleur for bicycles. The device provides the cable guide parts with alternative cable routing paths, wherein the cable guide parts are securely connected to the connecting arm. The cable clamping screw for clamping the control cable is housed in a space saving manner in an opening in the cable guide part, wherein a direct transfer of the actuating forces to the connecting arm is possible with small frictional losses.

10 Claims, 4 Drawing Sheets

CABLE CONTROL ACTUATING DEVICE FOR A BICYCLE DERAILLEUR

BACKGROUND OF THE INVENTION

The invention relates to a device for guiding and supporting the cable for actuating a front derailleur for bicycles.

Front derailleurs on bicycles serve the purpose of moving the drive chain between various chain wheels mounted on the pedal crank. These front derailleurs have a stationary part, a parallelogram mechanism, and a moveable part. The stationary part is connected to the bicycle frame, and a chain guide for interacting with the chain is mounted on the moveable part. In order to mount on the bicycle frame, the stationary part has a fastening clamp, of which the size also varies as a function of the diameter of the seat tube. To some extent the seat tube exhibits an oval cross section. In this case the stationary part is screwed to a soldered-on part that is attached to the seat tube; or a flexible clamp is used. The chain guide is adapted to the ratio of the number of teeth and/or the ratio of the diameters of the chain wheels. Racing bikes have typically two chain wheels, whereas mountain bikes have three chain wheels. The chain guide has suitably designed guide parts in the regions, in which contact with the chain occurs when changing gears. The seat tube on the bicycle has various angular positions in relation to the chain stay, a feature that has an additional impact on the design of the chain guide.

There exist a plethora of other embodiments of derailleurs as a function of whether the actuating cable is run either towards the bottom around the pedal bearing housing or towards the top following the seat tube. Finally, the derailleurs may be alternatively actuated from the retracted position into the extended position either by actuating the cable control device or by the force of the return spring.

The available design space, in which a derailleur can be housed, consists of the free space inside the chain wheels, outside the seat tube and above the pedal bearing housing as well as to a limited degree between the rear wheel tire and/or the mud guard and the seat tube. In this case a mountain bike has significantly more free space between the seat tube and the tire than a racing bike, where there is the tendency to push the rear wheel as far as possible in the direction of the pedal bearing, as a result of which the rear wheel tire comes very close to the seat tube.

EP 0 653 347 shows a derailleur that has a pronounced cable guide region on the inner tensioning arm. Hence, the tensioning arm is significantly enlarged and more expensive to manufacture. As a result of the one-piece connection between the originally rod shaped arm and the cable guide, there is no longer any disturbing resilience that could result in a loss in the actuating path of the cable control device.

EP 1 040 992 shows a removable cable guide adapter that, in addition to the advantages of a cable guide, also makes it possible to adapt the derailleur to various conditions with respect to actuating the cable. The drawback with this design is that all of the deformations at the adapter have a direct impact on the cable actuation system. In any case it has to be guaranteed that after the adapter is mounted on the actuating arm, said adapter is securely connected to this actuating arm; and it must be achieved without incurring a high cost in terms of construction.

SUMMARY OF THE INVENTION

In accordance with an embodiment of the invention, an aspect of the invention is to provide a cable guide that is connected to the tensioning arm and that does not exhibit any of the aforementioned drawbacks. This is achieved by the fact that the tensioning arm and the cable guide are connected together in a secure manner. The cable guide is constructed in conformity with the requirements. It has guide means that guarantee a reliable guide and support of the actuating cable, both for running the cable to the top and also towards the bottom. In addition, the cable guide is space saving and the losses in actuating force as a result of friction are low. In addition, a clamping projection on the connecting arm is passed through an opening on the cable guide, as a result of which the forces generated during the actuation operation engage close to the plane in which the cable guide extends. Furthermore, the cable clamping screw is screwed in by means of the cable guide, as a result of which the elements for clamping the cable are positioned on one side of the cable guide, whereas the screw head of the clamping screw is situated on the opposite side of the cable guide. The cable clamping screw is oriented to provide easy access to the screw head with the tool. This feature is in the interest of the bike rider who can install and align the derailleur in a simple way. The situation is similar when a bike manufacture does the installation.

In this approach to a solution the connecting arm does not have to exist in a larger number of design variants. The adaptation to different installation conditions is performed by combining a connecting arm with various cable guides and then using this combination to install the complete derailleur.

These as well as other aspects and advantages of the invention will become further apparent to those of ordinary skill in the art by reading the following detailed description, with reference where appropriate to the accompanying drawings.

DETAILED DESCRIPTION

Figure 1:
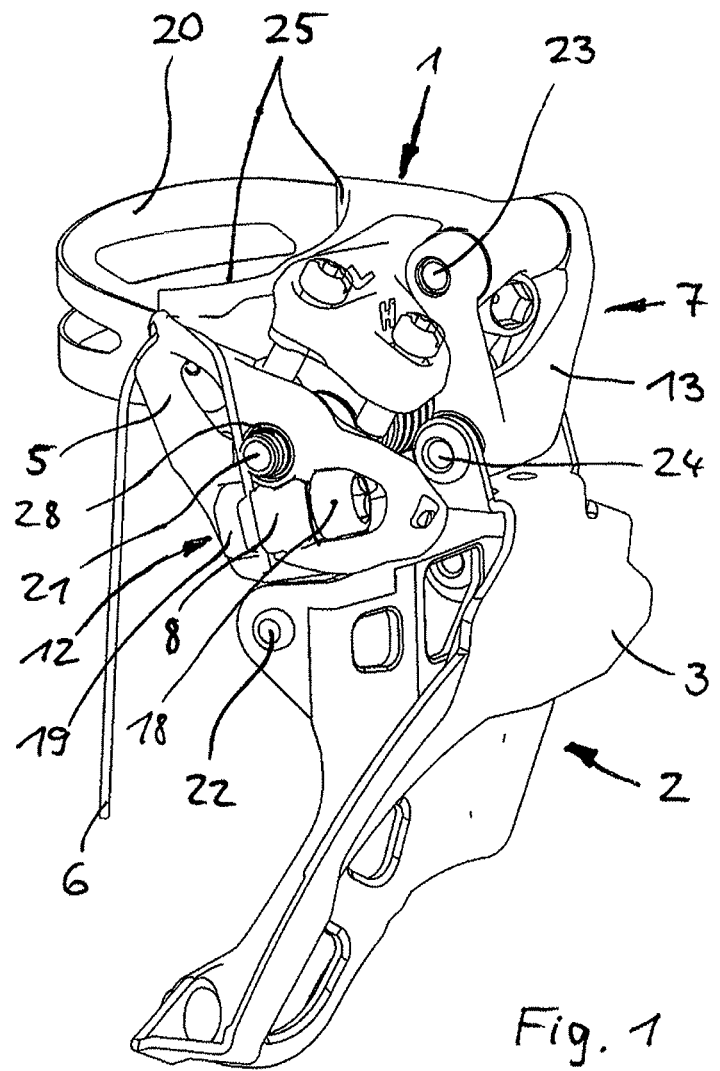
FIG. 1 shows a front derailleur that is intended for a bicycle and that uses the cable control actuating device according to an embodiment of the invention, wherein the control cable is run toward the bottom.
Figure 2:
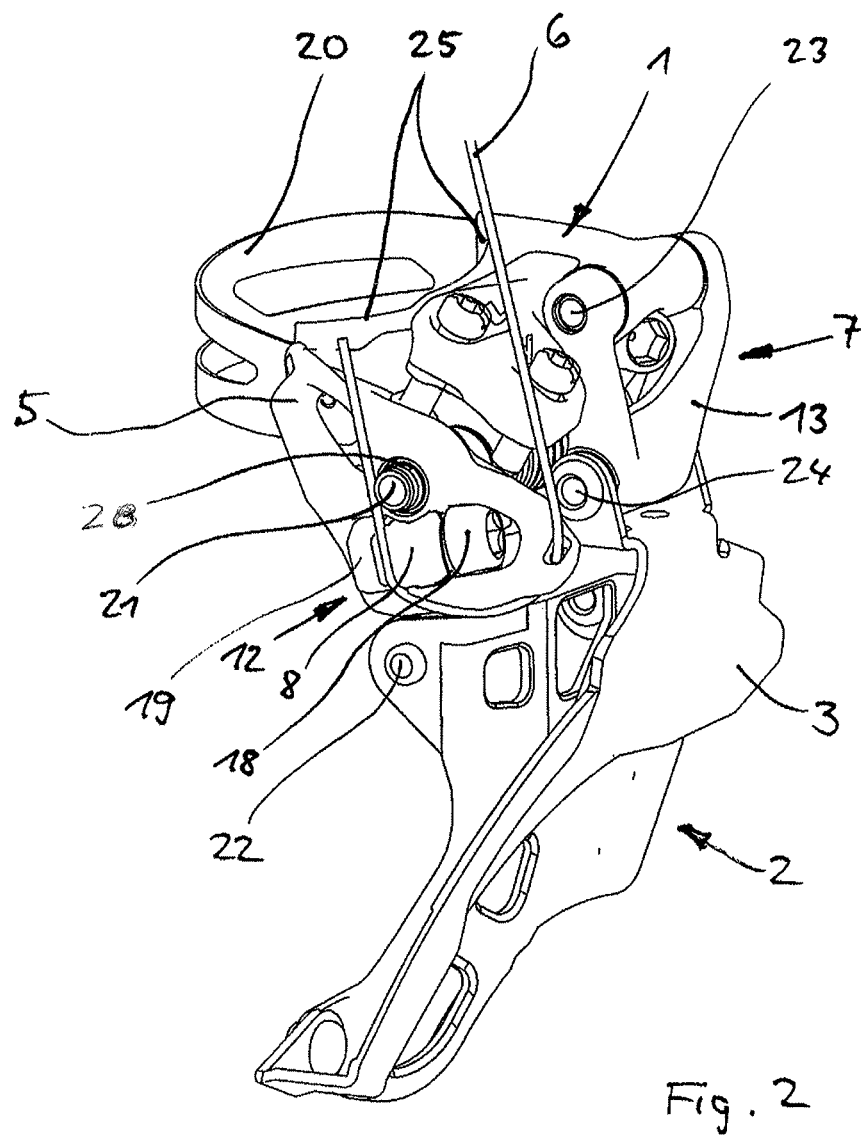
FIG. 2 shows a front derailleur that is intended for a bicycle and that uses the cable control actuating device according to an embodiment of the invention, wherein the control cable is run toward the top.

FIGS. 1 and 2 show the inventive cable guide on a front derailleur. In FIG. 1 the actuating cable is routed downwards; and in FIG. 2 upwards. The derailleur includes the stationary part 1, the moveable part 2 and the parallelogram mechanism 7, which connects the stationary part 1 to the moveable part 2. The main components of the parallelogram mechanism 7 are the connecting arm 4 and the guide arm 13. The connecting arm 4 is pivotably connected to the hinge pin 21 on the stationary part 1 and to the hinge pin 22 on the moveable part 2. The guide arm 13 is pivotably connected to the hinge pin 23 on the stationary part 1 and to the hinge pin 24 on the moveable part 2. The hinge pin 21 is arranged at a lower position than the hinge pin 23.

Since the distance between the hinge pins 21 and 22 in the connecting arm and, thus, the length of the connecting arm 4 is equal to the length of the guide arm 13, the inclination angle of the chain guide 3, connected to the moveable part 2, does not change when pivoting from a retracted position to an extended position. The chain guide has a passage for the chain and shifts the chain between the chain wheels at the pedal bearing.

The movement of the chain guide from the retracted to the extended position is performed by a pull movement at the actuating cable 6. The opposite movement is performed through the effect of a return spring that is disposed around the hinge pin 21.

The stationary part 1 of the derailleur is securely connected to a component of the bicycle frame. To this end, the illustrated embodiment provides a flexible clamp 20, which is wrapped around the seat tube and which is compressed with a tightening screw and presses the seat tube support 25 on the stationary part 1 against the seat tube. An alternative possibility of fastening consists of the use of a rigid clamp with a hinge on the stationary part 1 and a direct mounting, in which the stationary part 1 is securely screwed to a soldered-on part on the seat tube by means of a screw, for example.

Figure 3:
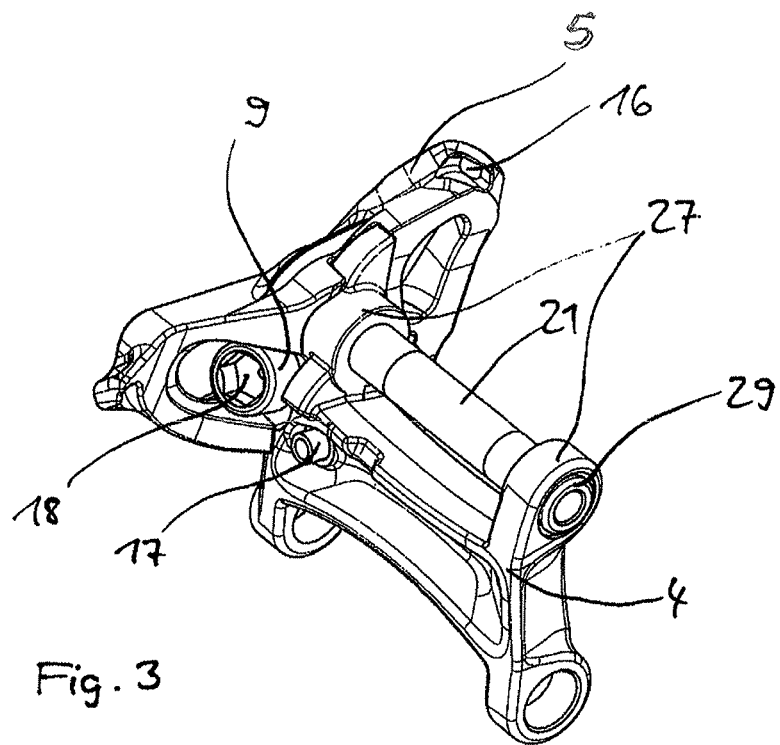
FIG. 3 shows the connecting arm and the cable guide part, which is connected in a secure manner to the connecting arm, wherein the viewing direction makes it possible to see the cable clamping screw that extends obliquely through the cable guide part.
Figure 4:
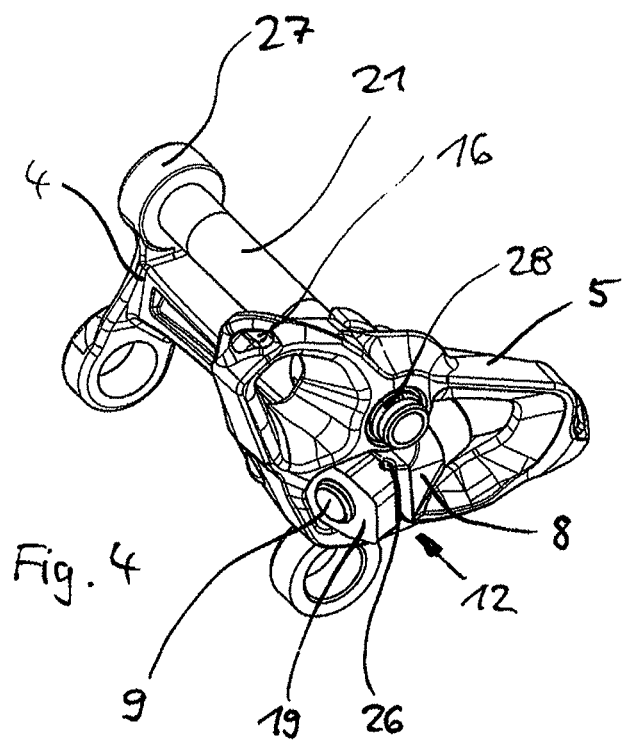
FIG. 4 shows the connecting arm and the cable guide part, which is connected in a secure manner to the connecting arm, wherein the viewing direction makes it possible to see the cable clamping device positioned on the opposite side in relation to the screw head on the cable guide part.

In the assembled state the cable guide part 5 is non-rotatably connected to the connecting arm 4, as apparent from FIGS. 3 and 4. The hinge pin 21 is mounted on the connecting arm 4 inside the pin bosses 27. The center region of said hinge pin runs through the stationary part 1, and one end of said hinge pin runs through the first opening 10 on the cable guide part 5. A rivet head 29 of the hinge pin 21 (shown on the right in FIG. 3, on the left in FIG. 4) and a spring lock washer 28 (shown on the right in FIG. 4, and on the left side in FIG. 3, but covered) secure the hinge pin in the axial direction in relation to the cable guide part 5 and the connecting arm 4. The rivet head 29 and the spring lock washer 28 represent axially effective stops, of which their function could also be achieved with other means, such as a circumferential flange or an obliquely inserted pin.

Figure 5:
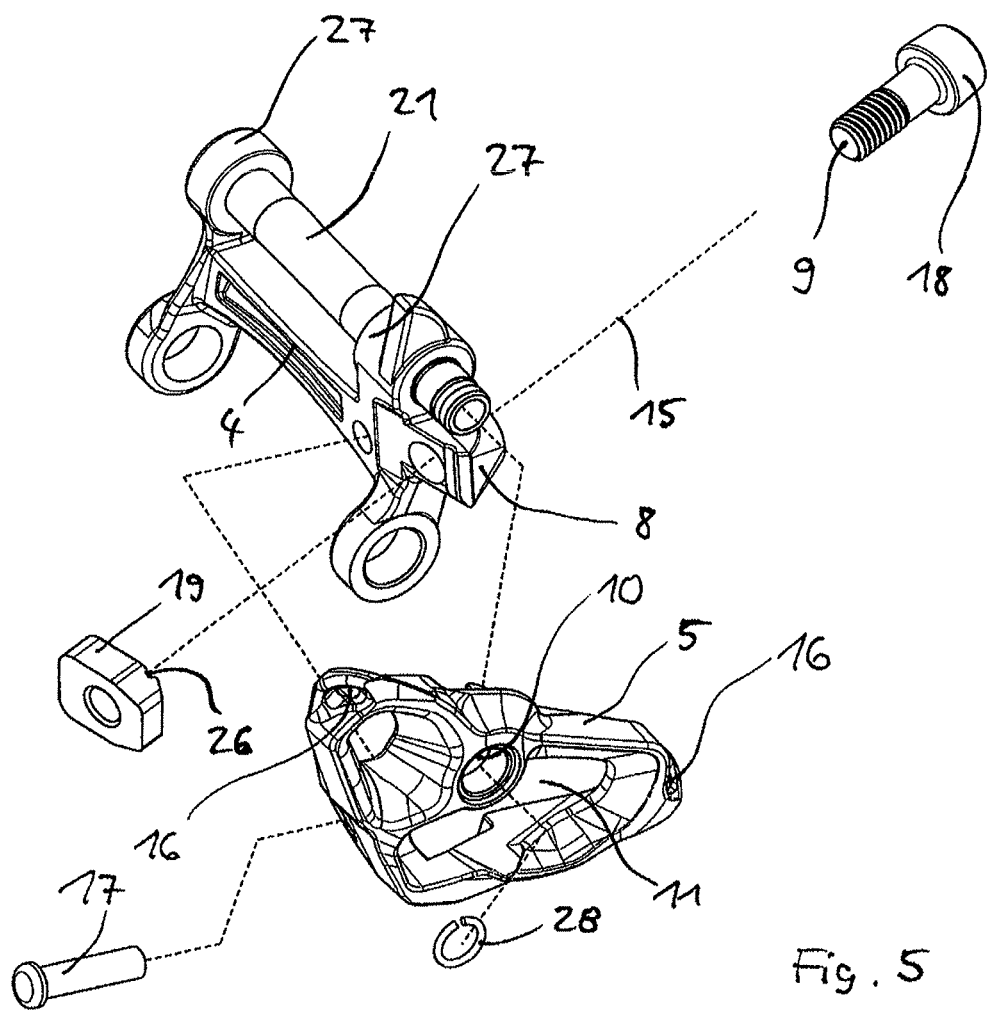
FIG. 5 shows the connecting arm and the cable guide part in the state prior to the installation.

In addition to the first connection between the connecting arm 4 and the cable guide part 5 by means of the hinge pin 21, there is a second connection due to the bolt 17 extending through cable guide part 5 and connecting arm 4, as shown in FIG. 5 in the disassembled state and shown in FIG. 3 in the assembled state. The result is a secure connection between the connecting arm 4 and the cable guide part 5. Owing to the hinge pin 21, the cable guide part 5 and the connecting arm 4 are securely attached to each other in the axial direction. The bolt 17 prevents the cable guide part 5 and the connecting arm 4 from rotating in any way in relation to each other about the hinge pin 21.

The cable clamping screw 9 in connection with the cable clamping plate 19 and the clamping projection 8, which fits into the second opening 11 of the cable guide part 5, form the cable clamping device 12. The actuating cable 6 is clamped in a groove 26 on the cable clamping plate 19 and is guided to one of the openings 16 as a function of the cable guide on the derailleur. These openings 16 serve to hold the actuating cable 6 and to prevent its release from the cable guide part 5. The cable-clamping device 12 is located on the cable guide part 5 on the side opposite the connecting arm 4. The result is a good accessibility, and an actuating cable 6 can be easily mounted and, if desired, replaced. On the other hand, there is only a short distance between the cable clamping and the passage of the hinge pin 21 through the stationary part 1. This distance to the bearing point on the pin boss 27 in a direction parallel to the hinge pin 21 is a function of the size of the frictional forces. Consequently the conditions are optimal for supporting the forces that are generated by the tensile force of the actuating cable 6. The frictional forces are kept low.

The longitudinal axis 15 of the cable clamping screw 9 extends obliquely to the plane in which the cable guide part 5 extends. Therefore, the screw head 18 comes to rest on the other side of the cable guide part 5 in relation to the cable-clamping device 12 and is readily accessible at this position for actuation with a tool.

Thus, the arrangement according to the invention offers a good solution for the requirement arising from the need for a larger number of design variants for the cable control actuating device. The connecting arm 4 that is relatively expensive to manufacture is adapted to the various conditions by the addition of cable guide parts 5 that can be designed in different ways. The connecting arm 4 and the cable guide part 5 are stable and rigidly connected to each other; and the actuating cable 6 does not suffer any losses with respect to the actuating path. In addition, the design solution offers good accessibility for the installation and replacement of the actuating cable control device, because the screw head 18 of the cable clamping screw 9 is placed at a place and orientation that is optimal for the user.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

What is claimed is:

1. A front derailleur including a cable control actuating device for a bicycle, comprising:
    a stationary part for fastening on the bicycle frame;
    a moveable part, which is connected in a moveable manner between a refracted and an extended position to a chain guide for shifting the chain between a plurality of chain wheels on a pedal crank device;
    a parallelogram mechanism connecting the stationary part and the moveable part, which contains a connecting arm of a parallelogram mechanism; and
    a cable guide part, which is non-rotatably connected to the connecting arm and is a part of the cable control actuating device; said cable guide part shaped to guide and accommodate an actuating cable of the cable control device as well as to route the actuating cable upwards on the bicycle frame, and alternatively to route the actuating cable downwards on the bicycle frame, wherein the connecting arm has a clamping projection for mounting a cable clamping screw, and wherein the cable guide part has a first opening shaped and sized to accommodate a hinge pin providing a rotatable connection between the connecting arm and the stationary part, and the cable guide part has a second opening shaped and sized to receive the clamping projection.

2. The front derailleur according to claim 1, wherein the hinge pin is securely attached in the axial direction in relation to the cable guide part and in relation to the connecting arm by stops on the hinge pin.

3. The front derailleur according to claim 1, wherein the cable guide part generally lies in a plane perpendicular to the hinge pin.

4. The front derailleur according to claim 3, wherein the cable clamping screw includes a longitudinal axis aligned obliquely to the plane.

5. The front derailleur according to claim 3, wherein the cable guide part has a first side that faces the parallelogram mechanism and on which the screw head of the cable clamping screw with engagement elements for tools is located; and
    a second side that faces away from the parallelogram mechanism and on which a cable clamping device clamps the actuating cable.

6. The front derailleur according to claim 5, wherein the cable clamping device for mounting the actuating cable on the connecting arm of the parallelogram mechanism comprises the clamping projection, the cable clamping screw and a cable clamping plate.

7. The front derailleur according to claim 1, wherein the connecting arm in relation to the stationary part is disposed below a guide arm of the parallelogram mechanism and between the guide arm and the stationary part.

8. The front derailleur according to claim 1 or 2, wherein the cable guide part has two openings for the alternative passage of the actuating cable that alternatively runs upwards or downwards from the derailleur.

9. The front derailleur according to claim 8, wherein the two openings are positioned on alternative sides of the cable guide part with the first opening being spaced therebetween.

10. The front derailleur according to claim 1, wherein the cable guide part is made of a synthetic plastic, aluminum, or carbon material.

\* \* \* \* \*